United States Patent
Noda et al.

(10) Patent No.: US 11,535,048 B2
(45) Date of Patent: Dec. 27, 2022

(54) ULTRAVIOLET RAY IRRADIATING APPARATUS AND IMAGE RECORDING APPARATUS PROVIDED WITH THE SAME

(71) Applicant: BROTHER KOGYO KABUSHIKI KAISHA, Nagoya (JP)

(72) Inventors: Masahiro Noda, Ogaki (JP); Atsushi Ito, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 38 days.

(21) Appl. No.: 17/199,711

(22) Filed: Mar. 12, 2021

(65) Prior Publication Data

US 2021/0291574 A1 Sep. 23, 2021

(30) Foreign Application Priority Data

Mar. 17, 2020 (JP) .............................. JP2020-046595

(51) Int. Cl.
*B41M 7/00* (2006.01)
*B41J 11/00* (2006.01)
*C09D 11/101* (2014.01)

(52) U.S. Cl.
CPC ...... *B41M 7/0081* (2013.01); *B41J 11/00214* (2021.01); *B41J 11/00218* (2021.01); *C09D 11/101* (2013.01)

(58) Field of Classification Search
CPC .............. B41M 7/0081; B41J 11/00214; B41J 11/00218; C09D 11/101
See application file for complete search history.

(56) References Cited

U.S. PATENT DOCUMENTS 10,137,703 B2 * 11/2018 Tsuchiya ............ B41J 11/00214

FOREIGN PATENT DOCUMENTS

JP 2008-288457 A 11/2008

OTHER PUBLICATIONS

Related U.S. Appl. No. 17/199,673, filed Mar. 12, 2021.

* cited by examiner

*Primary Examiner* — Bradley W Thies
(74) *Attorney, Agent, or Firm* — Scully, Scott, Murphy & Presser, PC

(57) ABSTRACT

There is provided an ultraviolet ray irradiating apparatus configured to cure an ultraviolet-curable ink discharged to an object, by a discharging head which is configured to move in a main scanning direction, in a state that the ultraviolet ray irradiating apparatus is moved in the main scanning direction. The ultraviolet ray irradiating apparatus includes a plurality of light emitting chips configured to emit an ultraviolet ray, the plurality of light emitting chips being arranged side by side with a first pitch in the main scanning direction and being arranged side by side with a second pitch smaller than the first pitch in a sub scanning direction orthogonal to the main scanning direction.

19 Claims, 7 Drawing Sheets

Fig. 4
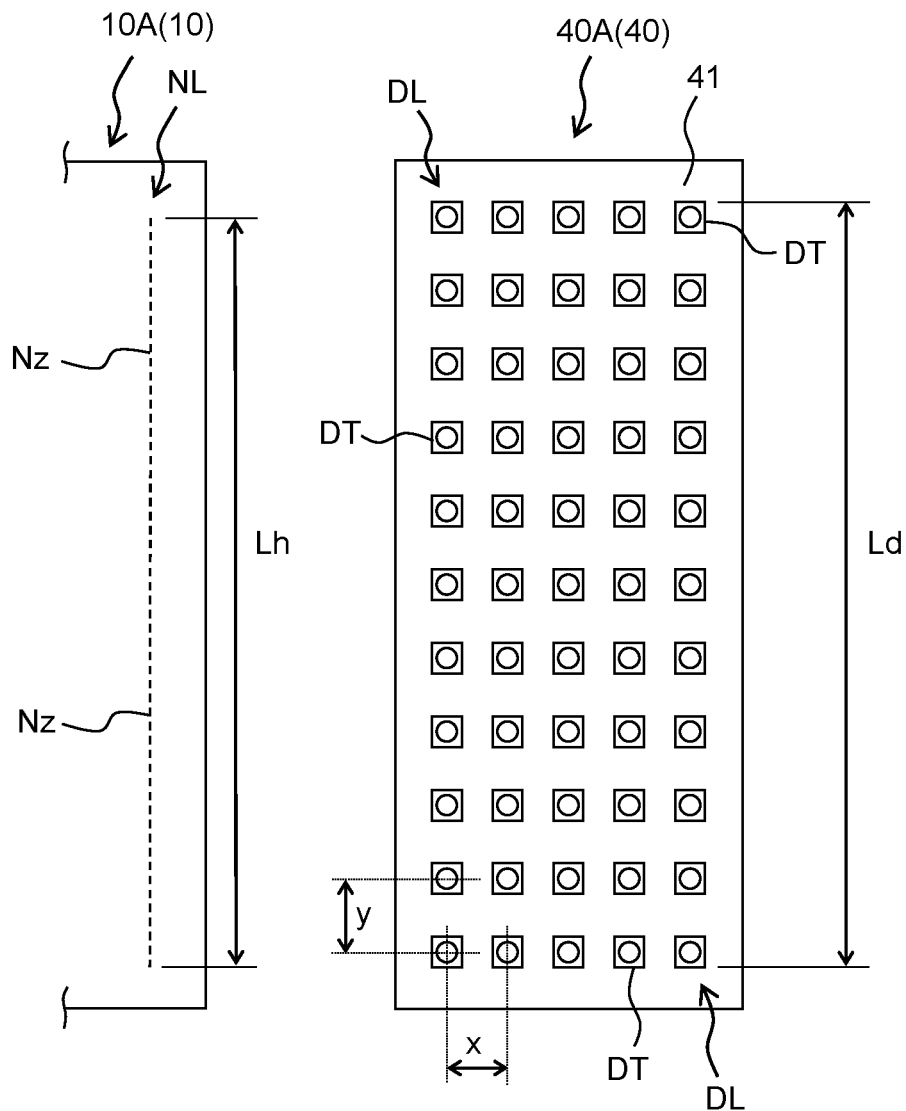
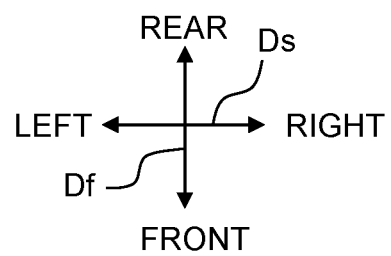

ULTRAVIOLET RAY IRRADIATING APPARATUS AND IMAGE RECORDING APPARATUS PROVIDED WITH THE SAME

CROSS REFERENCE TO RELATED APPLICATION

The present application claims priority from Japanese Patent Application No. 2020-046595, filed on Mar. 17, 2020, the disclosure of which is incorporated herein by reference in its entirety.

BACKGROUND

The present disclosure relates to an ultraviolet ray irradiating apparatus and an image recording apparatus provided with the ultraviolet ray irradiating apparatus.

In the recent years, there is a known ultraviolet ray irradiating apparatus which is used for a printing machine, and which irradiates, with an ultraviolet ray, an ultraviolet-curable ink which is cured by the ultraviolet ray.

SUMMARY

An object of the present disclosure to provide an ultraviolet ray irradiating apparatus capable of suppressing the temperature rise in the part, of the printing object, which is subjected to the small gap printing and of improving the ink curability in the part, of the printing object, subjected to large gap printing, and an image recording apparatus provided with the ultraviolet ray irradiating apparatus.

According to an aspect of the present disclosure, there is provided an ultraviolet ray irradiating apparatus configured to cure an ultraviolet-curable ink discharged to an object, by a discharging head which is configured to move in a main scanning direction, in a state that the ultraviolet ray irradiating apparatus is moved in the main scanning direction, the ultraviolet ray irradiating apparatus comprising a plurality of light emitting chips configured to emit an ultraviolet ray, the plurality of light emitting chips being arranged side by side with a first pitch in the main scanning direction and being arranged side by side with a second pitch smaller than the first pitch in a sub scanning direction orthogonal to the main scanning direction.

BRIEF DESCRIPTION OF THE DRAWINGS

FIG. 4 is a bottom view depicting an example of arrangement of a nozzle array (nozzle column) in the discharging head of FIG. 1 and an example of arrangement of a plurality of light emitting diode chips in the ultraviolet ray irradiating apparatus.

EMBODIMENTS

Figure 1:
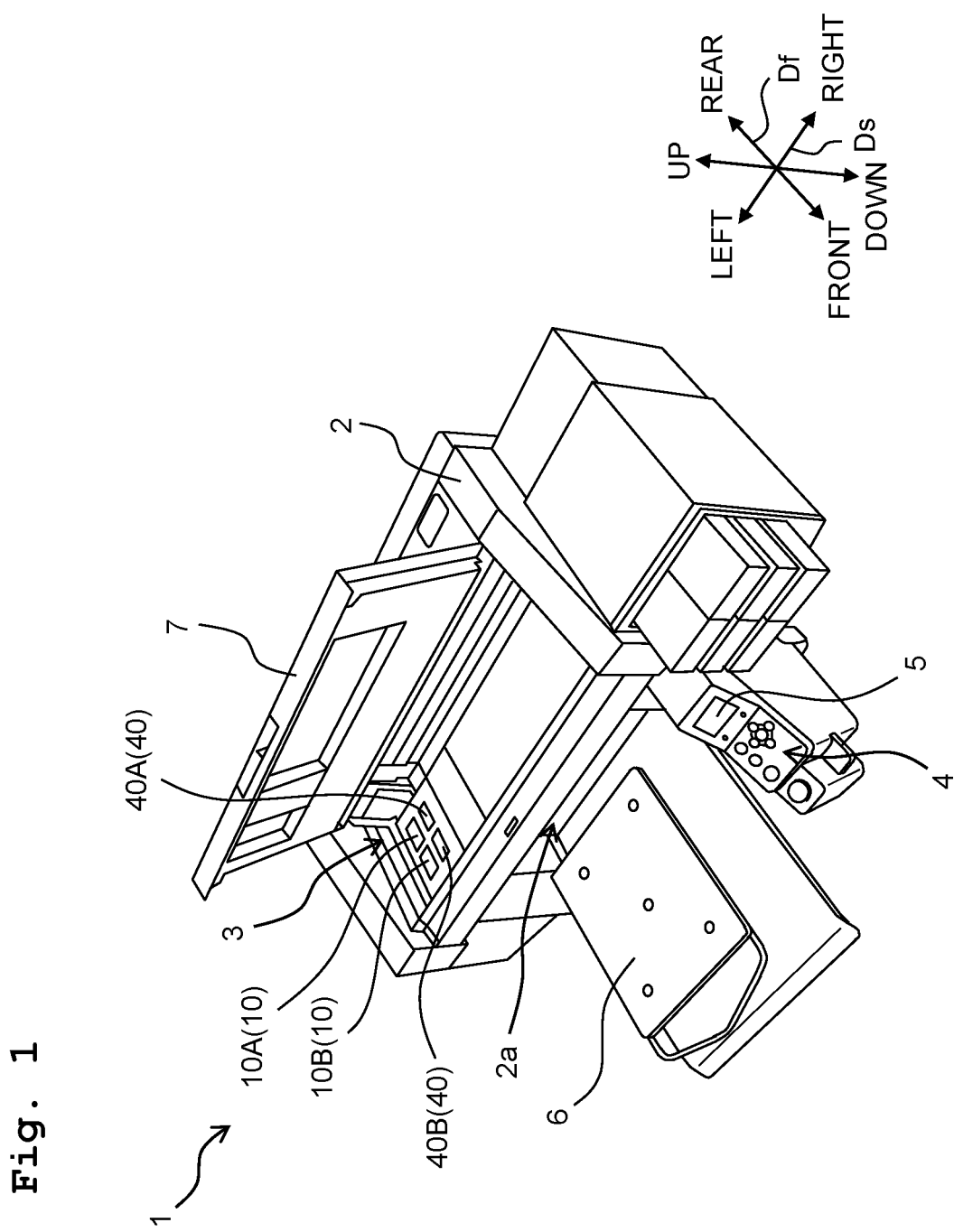
FIG. 1 is a perspective view depicting an image recording apparatus related to an embodiment of the present disclosure.

If the ultraviolet ray irradiating apparatus is used with an ink jet printer, an ink liquid droplet landed on a printing object is irradiated with the ultraviolet ray so that the ultraviolet-curable ink is cured and fixed to the printing object. The use of the ultraviolet-curable ink in this manner enables printing to be performed on, for example, a resin, a metal, etc., other than paper sheet, and a printing object with glossiness can be obtained.

In the ultraviolet ray irradiating apparatus of Japanese Patent Application Laid-open No. 2008-288457, a plurality of light emitting diode chips are provided on a supporting substrate. The plurality of light emitting diode chips is arranged in a matrix shape along the longitudinal direction and the short-length direction of the supporting substrate. An arrangement pitch of the plurality of light emitting diode chips in the longitudinal direction of the supporting substrate is set to be greater than the arrangement pitch of the plurality of light emitting diode chips in the short-length direction of the supporting substrate. In such a configuration, it is considered that, by continuously irradiating the printing object with the ultraviolet ray while conveying the printing object in a direction in which the arrangement pitch is smaller, a phenomenon of oxygen inhibition that a monomer contained in the ultraviolet-curable ink is bonded to the oxygen is less likely to occur.

Note that in the image recording apparatus including the ultraviolet ray irradiating apparatus, in a case that printing is performed while moving a discharging head and a printing object relative to each other, it is required to perform printing with respect to a printing object having a three-dimensional shape in which a distance from a nozzle of the discharging head to a landing position of the ink droplet on the printing object changes. With respect to the printing object having such a three-dimensional shape, printing by discharging the ink droplet of the ink to a part in which the distance from the nozzle is small (a small gap printing, a low gap printing) and printing by discharging the ink droplet to a part in which the distance from the nozzle is great (a large gap printing, a high gap printing) are performed. Thereafter, while the plurality of light emitting diode chips and the printing object are moved relative to each other, the printing object is irradiated with the ultraviolet ray; however, in the part having the printing performed thereon by the small gap printing, a distance from ultraviolet ray irradiation surfaces of the plurality of light emitting diode chips also becomes to be small, and in the part having the printing performed thereon by the large gap printing, the distance from the ultraviolet ray irradiation surfaces of the plurality of light emitting diode chips also becomes to be great. In a case of irradiating the part subjected to the small gap printing with the ultraviolet ray, it is necessary to suppress any temperature rise or increase in the printing object due to the irradiation of the ultraviolet ray. In contrast, in a case of irradiating the part subjected to the large gap printing with the ultraviolet ray, it is necessary to irradiate an ultraviolet ray having a cumulative energy (illuminance of the ultraviolet ray x illumination time) having a not less than a predetermined value so as to sufficiently cure the ink. According to the above-described conventional ultraviolet ray irradiating apparatus, however, although it is disclosed to be capable of suppressing the oxygen inhibition, there is not any reference to the suppression of the temperature rise in a part, of the printing object, having the printing performed thereon by the small gap printing, and to the improvement of ink curability in a part, of the printing object W, having the printing performed thereon by the large gap printing.

The inventors of the present disclosure diligently conducted researches, regarding the arrangement of a plurality of light emitting diode chips in an ultraviolet ray irradiating apparatus configured to irradiate an ultraviolet ray for curing a ultraviolet-curable ink, from a viewpoint of suppressing any temperature rise of the printing object due to an excessive irradiation with the ultraviolet ray (the illuminance becoming too high) and a viewpoint of suppressing any shortage in the ink curability due to insufficient irradiation of the ultraviolet ray (the integrated light amount becoming too little). According to the conventional configuration, it is possible to continuously irradiate a printing object with the ultraviolet ray while conveying the printing object in a direction in which the arrangement pitch is small. With this, it is considered that the phenomenon of the oxygen inhibition is less likely to occur. However, there is no disclosure, in the conventional ultraviolet ray irradiating apparatus, regarding as to how the plurality of light emitting diode chips are to be arranged in an ultraviolet ray irradiating apparatus in a case of performing printing with respect to a part, of the printing object, at which the distance from an ultraviolet ray irradiation surface of each of the plurality of light emitting diode chips becomes to be the small gap and in a case of performing printing with respect to a part, of the printing object, at which the distance from the ultraviolet ray irradiation surface becomes to be the large gap. Specifically, in a case of irradiating a part, of the printing object, which is subjected to the small gap printing, with the ultraviolet ray, the distance between the ultraviolet ray irradiation surface and the printing object becomes to be short, and thus it is required to suppress any temperature rise due to excessive irradiation of the printing object with the ultraviolet ray (the illuminance becoming too high). However, in the conventional configuration, the arrangement pitch in a short-length direction of the supporting substrate (conveyance direction of the printing object) is set to be relatively small. Therefore, the illuminance of the ultraviolet ray at the part subjected to the small gap printing becomes to be too high, which in turn leads to such a fear that any damage might occur in the printing object due to the heat. On the other hand, in a case of performing printing in a part, of the printing object, at which the distance from the ultraviolet ray irradiation surface becomes to be the large gap, the ink is not sufficiently cured unless the part is irradiated with an ultraviolet ray having not less than a predetermined integrated energy. However, since the arranging pitch in the longitudinal direction of the supporting substrate in the conventional configuration is set to be relatively large, and thus the irradiation time of the ultraviolet ray becomes to be short in one time of relative movement of the printing object, which leads to such a fear that the irradiation amount of the ultraviolet ray might become to be insufficient with respect to the part subjected to the large gap printing, and consequently to such a possibility that the ink might not be sufficiently cured. The inventors of the present disclosure pursued the research further in order to obtain an effect of preventing the thermal damage due to the thermal effect in such a part subjected to the small gap printing, and an effect of improving the ink curability in a part subjected to the large gap printing. As a result, the inventors arrived at an invention exemplified, for example, by the configuration as explained below.

In the following, an ultraviolet ray irradiating apparatus and an image recording apparatus including the same related to the embodiment of the present disclosure will be explained, with reference to the drawings. Each of the ultraviolet ray irradiating apparatus and the image recording apparatus explained below is merely an embodiment of the present invention. Therefore, the present invention is not limited to or restricted by the following embodiment, and any addition, deletion and change can be made with respect to the present disclosure, without departing from the spirit of the present invention.

FIG. 1 is a perspective view depicting an image recording apparatus 1 related to an embodiment of the present disclosure. In FIG. 1, directions which are mutually orthogonal are defined as an up-down direction, a left-right direction and a front-rear direction. Note that the left-right direction is a main scanning direction Ds (to be described later on) and the front-rear direction is a sub scanning direction Df (to be described later on). This image recording apparatus 1 performs not only printing with respect to a printing object (object, print matter) W such as print paper sheet (paper), but also performs, for example, a goods printing of performing printing on a printing object W (FIG. 6) such as a resin, as a variety of kinds of goods. Note that the printing object W may include objects made or shaped by 3D printers.

As depicted in FIG. 1, the image recording apparatus 1 of the present embodiment includes a casing 2, a carriage 3, an operating key 4, a displaying part 5, a platen 6, and an upper cover 7. The image recording apparatus 1 also includes a controller (a control unit) 19 of FIG. 3.

The casing 2 is formed to have a box shape. The casing 2 has an opening 2a on a front surface thereof and a non-illustrated opening on a back surface thereof. The operating key 4 is provided on the casing 2 at a location thereof on the right front side. The displaying part 5 is provided at a location on the rear side of the operating key 4. The operating key 4 receives an operation and input by a user. The displaying part 5 is constructed, for example, of a touch panel, and displays predetermined information. A portion of the displaying part 5 also functions as an operating key at a predetermined timing. The controller 19 realizes a printing function and controls displaying of the displaying part 5 based on an input from the operating key 4 or an external input via a non-illustrated communicating interface.

Figure 2:
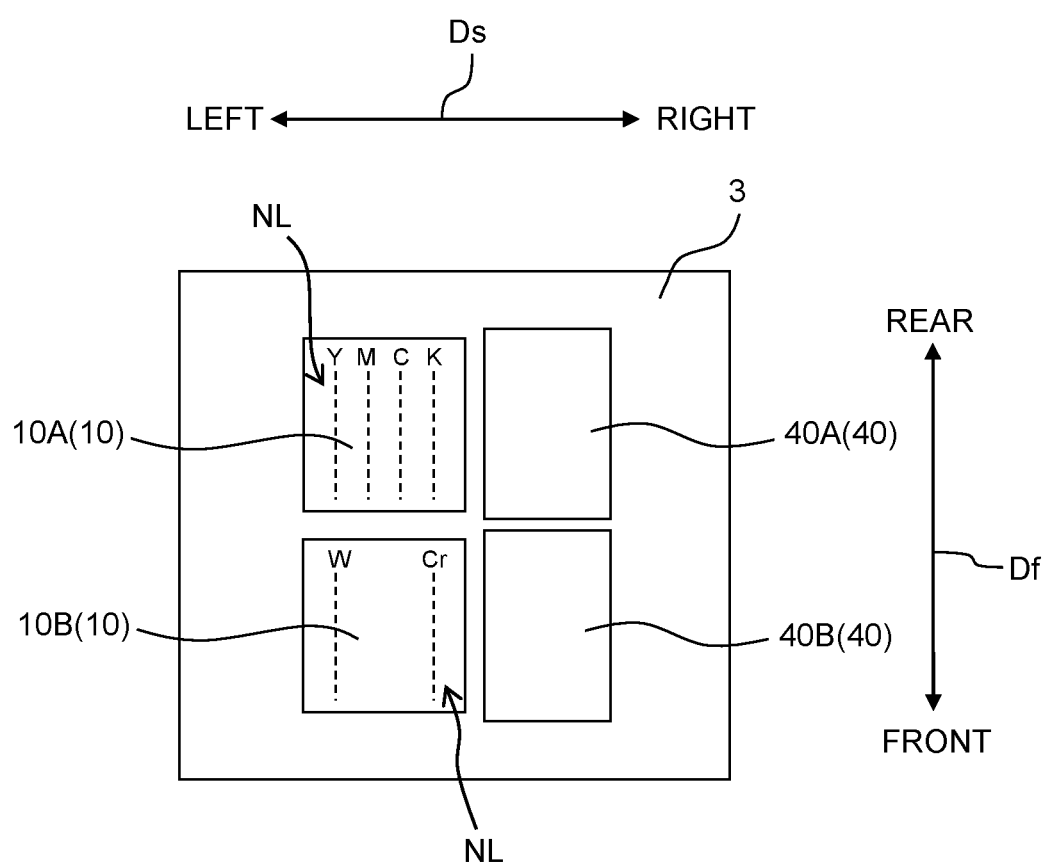
FIG. 2 is a plan view depicting an example of arrangement of a discharging head and an ultraviolet ray irradiating apparatus which are mounted on a carriage of FIG. 1.

The carriage 3 is configured to be reciprocally movable along the main scanning direction Ds. As depicted in FIG. 2, the carriage 3 has two discharging heads 10 (10A, 10B) and two ultraviolet ray irradiating apparatuses 40 (40A, 40B) mounted thereon. As each of the discharging heads 10, it is possible to use, for example, an ink-jet head which discharges or ejects an ultraviolet-curable ink. Further, each of the ultraviolet ray irradiating apparatuses 40 has a plurality of light emitting diode chips (light emitting chips) DT (FIG. 4) which emit an ultraviolet ray, and irradiates the ultraviolet ray for curing the ink discharged by the discharging head(s) 10. The discharging head 10A and the discharging head 10B are arranged side by side along the sub scanning direction Df. The discharging head 10B is located in front of the discharging head 10A. Furthermore, the ultraviolet ray irradiating apparatus 40A and the ultraviolet ray irradiating apparatus 40B are arranged side by side along the sub scanning direction Df. The ultraviolet ray irradiating apparatus 40B is located in front of the ultraviolet ray irradiating apparatus 40A. Moreover, the discharging head 10A and the ultraviolet ray irradiating apparatus 40A are arranged side by side along the main scanning direction Ds. The ultraviolet ray irradiating apparatus 40A is located on the right side with respect to the discharging head 10A. The discharging head 10B and the ultraviolet ray irradiating apparatus 40B are arranged side by side along the main scanning direction Ds. The ultraviolet ray irradiating apparatus 40B is located on the right side with respect to the discharging head 10B.

In FIG. 2, in one pass in a printing processing, the carriage 3 moves to the left side in the main scanning direction Ds. As a result, the discharging heads 10 and the ultraviolet ray irradiating apparatuses 40 move leftward at the time of the printing processing. In this case, each of the discharging heads 10 discharges the ink to the printing object W while moving to the left side in the main scanning direction Ds, and each of the ultraviolet ray irradiating apparatuses 40 emits the ultraviolet ray to the ink landed on the printing object W while moving to the left side in the main scanning direction Ds. As a result, since the ultraviolet ray irradiating apparatuses 40 are positioned on the rear side with respect to the discharging heads 10 in the moving direction of the carriage 3 at the time of the printing processing, the ink immediately after having landed on the printing object W can be irradiated with the ultraviolet ray.

In a case that one pass of the printing processing is finished, the carriage 3 moves to the right side in the main scanning direction Ds and returns to a predetermined position in the main scanning direction Ds. This moves the discharging heads 10 and the ultraviolet ray irradiating apparatuses 40 to the right side in the main scanning direction Ds. In this case, each of the discharging heads 10 moves to the right side in the main scanning direction Ds without discharging the ink, and each of the ultraviolet ray irradiating apparatuses 40 moves to the right side in the main scanning direction Ds while irradiating the ultraviolet ray to the ink discharged at the time of the printing processing. In the present embodiment, the integrated light amount by the plurality of light emitting diode chips DT obtained in one pass is, for example, not less than 85 mJ/cm$^2$. With this, the ink can be sufficiently irradiated with the ultraviolet ray, and the curability (hardenability) of the ink can be improved. Note that the wordings of "integrated light amount in one pass" and "integrated light amount per one pass" mean an integrated light amount obtained during a period in which the ultraviolet ray irradiating apparatus (or, carriage) moves from one end in the scanning direction Ds to the other end in the scanning direction Ds.

In the present embodiment, the discharging head 10A discharges inks of respective colors which are yellow (Y), magenta (M), cyan (C) and black (K), and which may be collectively referred to as a color ink. The discharging head 10A is provided with nozzle arrays (nozzle columns) NL which discharge these inks, respectively, and which extend along the sub scanning direction Df. The nozzle arrays NL are provided at a regular spacing distance along the main scanning direction Ds. Note that an arranging order in the main scanning direction Ds of the nozzle arrays NL is not limited to an order, as depicted in FIG. 2, from the left side, of a nozzle array NL discharging the ink of yellow (Y) color, a nozzle array NL discharging the ink of magenta (M) color, a nozzle array NL discharging the ink of cyan (C) color, and a nozzle array NL discharging the ink of black (K) color; and the arranging order may be appropriately set.

On the other hand, the discharging head 10B discharges a white (W) ink and a clear (Cr) ink. The discharging head 10B is provided with nozzle arrays NL discharging the white (W) ink and the clear (Cr) ink, respectively, and extending along the sub scanning direction Df. The nozzle arrays NL are provided at a regular spacing distance along the main scanning direction Ds. The spacing distance in the main scanning direction Ds between the respective nozzle arrays NL in the discharging head 10B may be different from the spacing distance in the main scanning direction Ds between the respective nozzle arrays NL in the discharging head 10A (examples of FIG. 2) or may be the same. Note that the arranging order in the main scanning direction Ds of the nozzle arrays NL is not limited to the arranging order, as depicted in FIG. 2, from the left side, of the nozzle array NL discharging the ink of white (W) color and the nozzle array NL discharging the ink of clear (Cr) color, and may be reversely arranged. The forgoing six color inks are discharged onto the printing object W to thereby print a color image on the printing object W. Specifically, in a case that the color image is to be printed on a fabric as the printing object W, the white ink is firstly discharged as a primer ink (base ink) in order to reduce any effect on the color of the fabric and the material of the fabric, and then the color ink(s) is (are) discharged onto the white ink. Note that the clear ink is discharged in a case of imparting luster (gloss) and/or in a case of protecting a printed part.

The platen 6 is configured so that the printing object W can be placed thereon. The platen 6 has a predetermined thickness, and is constructed of, for example, a rectangular shaped-plate member of which longitudinal direction is the sub scanning direction Df. The platen 6 is removably supported by a non-illustrated platen supporting stand. The above-described platen supporting stand is configured to be movable between a print position at which the printing with respect to the printing object W is executed, and a removal position at which the print matte W is removed from the platen 6. The print position is a position at which the platen 6 faces or is opposite to the discharging heads 10 and the removal position is a position at which the platen supporting stand is arranged at the outside of the casing 2 and at which the printing object W is placeable on the platen 6. At the time of the printing, since the platen 6 moves in the sub scanning direction Df, the printing object W placed on the platen 6 is conveyed in the sub scanning direction Df.

The upper cover 7 is configured so that in a case that a front part thereof is lifted, the front cover 7 is rotated upward, with a base end configured to be rotatable as the fulcrum. As a result, the interior (inner part) of the casing 2 is exposed.

Figure 3:
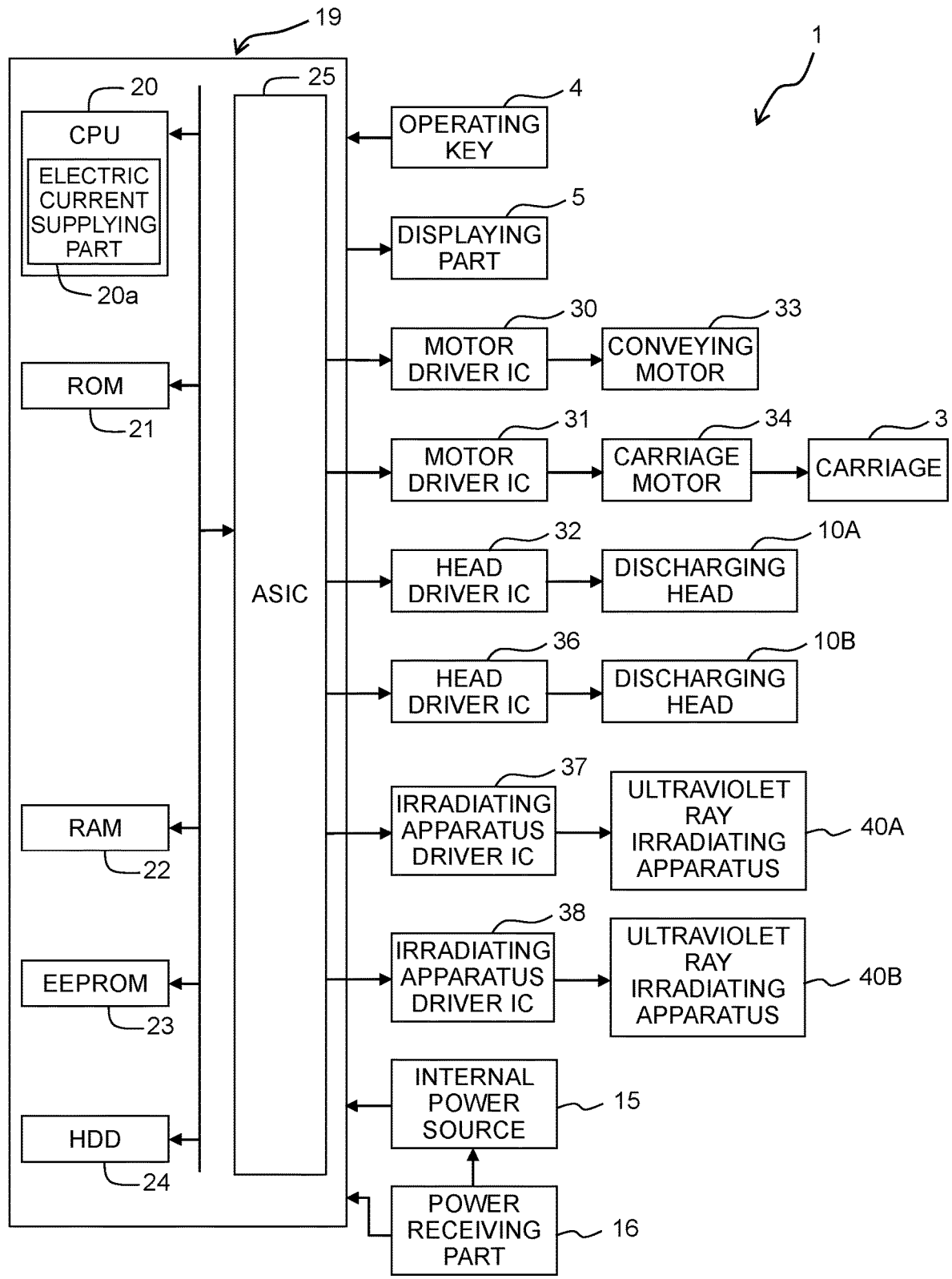
FIG. 3 is a block diagram depicting the configuration of the image recording apparatus of FIG. 1.

Next, the functions of respective configurations of the image recording apparatus 1 of the present embodiment will be explained, with reference to the block diagram of FIG. 3. As depicted in FIG. 3, the image recording apparatus 1 of the present embodiment includes motor driver ICs 30 and 31, head driver ICs 32 and 36, a conveying motor 33, a carriage motor 34, irradiating apparatus driver ICs 37 and 38, an internal power source 15, and a power receiving part 16, in addition to the constitutive elements described above. Note that the image recording apparatus 1 includes a non-illustrated ink tank configured to store the inks to be supplied to the discharging head(s) 10.

The controller 19 has a CPU 20, a memory (storage unit: a ROM 21, a RAM 22, a EEPROM 23, a HDD 24) and an ASIC 25. The CPU 20 is a controller of the image recording apparatus 1 and is connected to the memory (storage unit) and controls the respective driver ICs 30 to 32 and 36 to 38 and the displaying part 5. Further, the CPU 20 has an electric current supplying part 20a (to be described later on) as a functional configuration thereof.

The CPU 20 executes a variety of kinds of functions by executing a predetermined program stored in the ROM 21.

The CPU 20 may be mounted as one processor in the controller 19 or as a plurality of processors cooperating with each other.

The ROM 21 stores a print controlling program with which the CPU 20 executes the printing processing. An arithmetic result of the CPU 20 is stored in the RAM 22. A variety of kinds of initial setting information inputted by the user is stored in the EEPROM 23. Specifying information, etc., is stored in the HDD 24. This specifying information is highly confidential information of which leakage is not preferred and includes, for example, information regarding the user, job data received by the image recording apparatus 1 from the outside and including a user ID specifying a source (sender), user usage history information including the user ID in the job data, secure job data including data regarding a password and a secure job, print history, cloud setting data, etc. The information regarding the user includes, for example, telephone directory information, E-mail address information, information regarding an administrator of the image recording apparatus 1 (security administrator), network setting information, etc. In a case that the image recording apparatus 1 receives the job data, the CPU 20 stores, in the HDD 24, the user usage history information including the user ID in the job data.

The motor driver ICs 30 and 31, the head driver ICs 32 and 36, and the irradiating apparatus driver ICs 37 and 38 are connected to the ASIC 25. In a case that the CPU 20 receives the print job from the user, the CPU 20 outputs print instruction to the ASIC 25 based on the print controlling program. The ASIC 25 drives the respective driver ICs 30 to 32 and 36 to 38 based on the print instruction. The CPU 20 moves the platen 6 in the sub scanning direction Df by driving the conveying motor 33 with the motor driver IC 30, thereby conveying the printing object W. The CPU 20 also drives the carriage motor 34 with the motor driver IC 31 to thereby move the carriage 3. Further, the CPU 20 discharges or ejects, with the head driver ICs 32 and 36, the ink(s) from the discharging head(s) 10 mounted on the carriage 3 which is being moved, and causes the image data to be printed on the printing object W which is being conveyed. Furthermore, the CPU 20 causes the ultraviolet ray irradiating apparatuses 40A and 40B, with the irradiating apparatus driver ICs 37 and 38, to irradiate the ultraviolet ray for curing the ink(s). The printing processing is performed by such a flow. The controller 19 controls the ultraviolet ray irradiating apparatuses 40A and 40B, and thus the controller 19 may be regarded as a part of the ultraviolet ray irradiating apparatus of the present embodiment. Each of the controller 19, and the CPU 20 in the controller 19 is an example of the "controller".

The internal power source 15 is provided at a predetermined position in the casing 2. The internal power source 15 enables the controller 19 to be operable in a case that a power switch of a main body of the image recording apparatus 1 is in an OFF state. The internal power source 15 is, for example, a secondary cell (secondary battery). Further, the power receiving part 16 is provided so as to be exposed to the outside from the casing 2, and receives power supply from an external power source. In a case that the power switch of the main body is in an ON state, the power from the outside is supplied to each part of the image recording apparatus 1 via the power receiving part 16. The external power is supplied to the internal power source 15 via the power receiving part 16 regardless of the state of the power switch of the main body, and the internal power source 15 is charged by this power.

Next, an explanation will be given about an arrangement of the plurality of light emitting diode chips DT in the ultraviolet ray irradiating apparatus 40 of the present embodiment. In the present embodiment, each of the plurality of light emitting diode chips DT is a semiconductor element which generates the ultraviolet ray. Although the ultraviolet ray irradiating apparatus 40A and the discharging head 10A are representatively explained below, the ultraviolet ray irradiating apparatus 40B and the discharging head 10B can also be subjected to the configuration in the same manner as the ultraviolet ray irradiating apparatus 40A and the discharging head 10A.

As depicted in FIG. 4, the ultraviolet ray irradiating apparatus 40A includes a supporting substrate 41 formed, for example, in a rectangular shape in a plan view. Each of the plurality of light emitting diode chips DT is arranged on the supporting substrate 41.

Each of the plurality of light emitting diode chips DT irradiates the ink with the ultraviolet ray. With this, a photopolymerization initiating agent contained in the ink is caused to react, and to allow a monomer contained in the ink to polymerize, thereby fixing the ink to the printing object W. The plurality of light emitting diode chips DT is arranged in a matrix shape. The plurality of light emitting diode chips DT is arranged, for example, with a center of a unit lattice which is rectangular shaped and which has sides along the longitudinal direction and the short-length direction of the supporting substrate 41, as the reference. The plurality of light emitting diode chips DT is thereby arranged at a regular spacing distance along the main scanning direction Ds and at a regular spacing distance along the sub scanning direction Df. Thus, the plurality of light emitting diode chips DT are arranged along a row direction parallel to the main scanning direction Ds and along a column direction parallel to the sub scanning direction Df. FIG. 4 depicts an example wherein there are 11 (eleven) rows of the light emitting diode chip DT each of which is aligned in the left-right direction, and there are 5 (five) columns of the light emitting diode chip DT each of which is aligned in the front-rear direction. A group of light emitting diode chips DT, among the plurality of light emitting diode chips DT, which are aligned at a regular spacing distance therebetween along the sub scanning direction Df is defined as a chip column DL. Accordingly, FIG. 4 shows an example in which five chip columns DL are arranged. The number of the light emitting diode chip DT, the number of chip columns DL, and the number of chip rows arranged in the supporting substrate 41 are not limited to the above-described numbers, and are determined based on a cumulative irradiation light mount and/or power consumption in one pass, etc.

The discharging head 10A is provided with the four nozzle arrays NL as described above. Each of the nozzle arrays NL includes a plurality of nozzles Nz arranged side by side at a regular spacing distance along the sub scanning direction Df. The ink is discharged from the plurality of nozzles Nz. In each of the nozzle arrays NL, a distance from a nozzle Nz located at a front end of the sub scanning direction Df of the nozzle array NL to a nozzle Nz located at a rear end of the sub scanning direction Df of the nozzle array NL is defined as a nozzle length Lh. Note that FIG. 4 depicts only the nozzle array NL which discharges the ink of black (K), and that three other nozzle rows are omitted.

The respective light emitting diode chips DT of the ultraviolet ray irradiating apparatus 40A are arranged such that a light emitting area of the ultraviolet ray by the light emitting diode chips DT is greater in the sub scanning direction Df than the nozzle array NL. With this, in case that a length in the sub scanning direction Df of each of the chip columns DL, namely, a distance from a light emitting diode chip DT (a front end of the light emitting diode chip DT) located at a front end in the sub scanning direction Df to a light emitting diode chip DT (a rear end of the light emitting diode chip DT) positioned at a rear end in the sub scanning direction Df of each of the chip columns DL is made to be a light emitting length Ld, it is possible to make the light emitting length Ld to be greater than the nozzle length Lh. Therefore, the ultraviolet ray can be irradiated satisfactorily to an ink droplet discharged from the nozzle Nz located at the front end of the nozzle array NL and an ink droplet discharged from the nozzle Nz located at the rear end the nozzle array NL. In other words, in a state that the ultraviolet ray irradiating apparatuses 40 and the discharging heads 10 are mounted on the carriage 3, the nozzle allay NL and the chip column DL are parallel to each other, and the nozzle allay NL and the chip column DL are apart from each other in the main scanning direction Ds. In the sub scanning direction Df, the front end (one end) of the chip column DL is positioned front side of the front end (one end) of the nozzle array NL, and the rear end (the other end) of the chip column DL is positioned rear side of the rear end (the other end) of the nozzle array NL.

The respective light emitting diode chips DT are arranged side by side at a first pitch x in the main scanning direction Ds. Further, the respective light emitting diode chips DT are arranged side by side at a second pitch y in the sub scanning direction Df. The first pitch x is greater than the second pitch y. Specifically, the first pitch x and the second pitch y are determined so that $1.4y \leq x \leq 1.9y$ is satisfied or holds. The wording of "pitch" means a distance between optical axes of the light emitting diode chips DT adjacent to each other.

The controller 19 controls the illuminance of the ultraviolet ray emitted by the plurality of light emitting diode chips DT by, for example, changing magnitude of the supply current to each of the plurality of light emitting diode chips DT so as to change luminance of each of the plurality of light emitting diode chips DT. The magnitudes of the luminance of the plurality of light emitting diode chips DT may be identical to each other. The controller 19 may change the magnitudes of the luminance of the plurality of light emitting diode chips DT while maintaining a state in which the magnitudes of the luminance of the plurality of light emitting diode chips DT are identical to each other.

The controller 19 may obtain information (distance information DI) about a distance between the ultraviolet ray irradiation surface TS of the plurality of light emitting diode chips DT and the printing object W, and may control the illuminance of the ultraviolet ray emitted by the plurality of light emitting diode chips DT based on the distance information DI. The luminance of each of the plurality of light emitting diode chips DT required to realize the minimum illuminance (that is 1.1 W/cm² in this embodiment) and/or a minimum integrated light amount (that is 85 mJ/cm2 in this embodiment) required for curing the ink in the low part T1 of the printing object W can vary based on a size of the large gap GH. That is, the luminance of each of the plurality of light emitting diode chips DT required to realize the minimum illuminance and/or the minimum integrated light amount required for curing the ink in the low part T1 of the printing object W increases as the size of the large gap increases. Therefore, for example, by controlling the luminance of each of the plurality of light emitting diode chips DT based on the distance between the ultraviolet ray irradiation surface TS of the plurality of light emitting diode chips DT and the printing object W, the irradiation of the ultraviolet ray can be performed more efficiently and the printing quality can be improved.

The controller 19 may obtain the distance information DI from an external apparatus as a part of the job data. In this case, the distance information DI may be created in the external apparatus (a PC, for example) by obtaining coordinates (position data, arrangement data) of a surface of the printing object W by, for example, any image processing software, a printer driver, etc.

Figure 8:
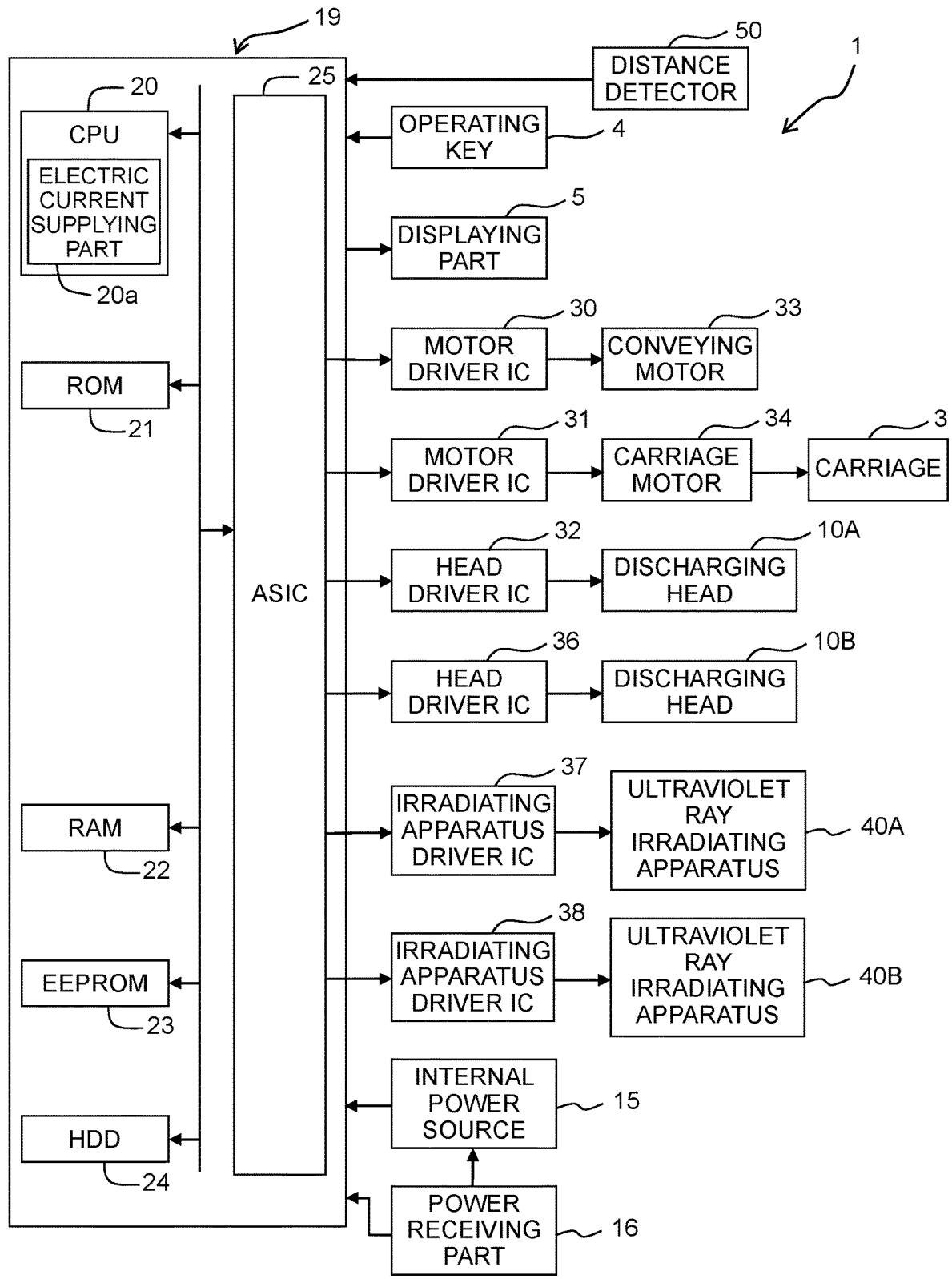
FIG. 8 is a block diagram depicting a configuration of an image recording apparatus of a modified embodiment.

As depicted in FIG. 8, the image recording apparatus 1 of the present embodiment may include a distance detector 50 which detects the distance between the ultraviolet ray irradiation surface TS of the plurality of light emitting diode chips DT and the printing object W. In this case, the controller 19 may create the distance information DI based on a value detected by the distance detector 50.

The distance detector 50 may be any device capable of detecting a distance, such as, for example, a camera (image sensor, stereo camera), an optical sensor, etc. The distance detector 50 may be provided on the lower surface of the carriage 3. The distance detector 50 may be regarded as a part of the ultraviolet ray irradiating apparatus of the present embodiment.

Figure 5:
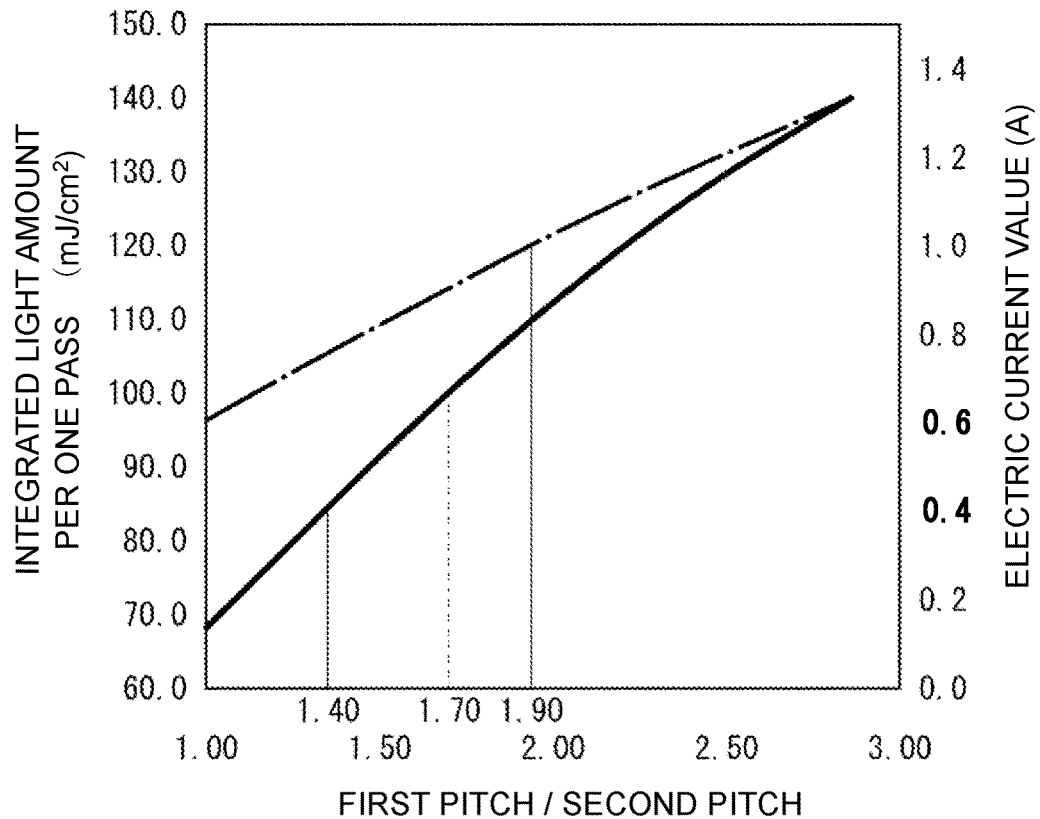
FIG. 5 is a graph, obtained by a simulation, providing a basis for relationship between the first pitch and the second pitch.

In the following, an explanation will be given about the reason, in the present embodiment, for setting $1.4y \leq x \leq 1.9y$ in a case of determining the first pitch x and the second pitch y. In FIG. 5, the ratio of the first pitch x to the second pitch y is taken on the abscissa (horizontal) axis, an integrated light amount (mJ/cm²) of the ultraviolet ray irradiated by the ultraviolet ray irradiating apparatus 40 per one pass is taken on the left-side ordinate (vertical) axis, and an electric current value (A) supplied to each of the plurality of light emitting diode chips DT is taken of the right-side ordinate axis. As depicted in FIG. 5, a relationship between the ratio of the first pitch x to the second pitch y and the integrated light amount is indicated by a solid line, and a relationship between the ratio and the electric current value is indicated by a dash-dot-line.

Specifically, the graph of the solid line in FIG. 5 indicates the integrated light amount per one pass obtained in a case that the ultraviolet ray is irradiated to the printing object W such that the maximum illuminance of the ultraviolet ray in a high part T2 of the printing object W to be not more than 4.5 W/cm². Here, the high part T2 is a part in which a distance from the ultraviolet ray irradiation surface TS of the plurality of light emitting diode chips DT to the printing object W becomes to be a small gap (low gap) GL (for example, 2 mm). As indicated by the solid line of FIG. 5, if the first pitch x is reduced while maintaining the second pitch y at a constant value, the light emitting diode chips DT are more crowded in the main scanning direction Ds. Thus, luminance of each of the light emitting diode chips DT is required to be reduced for maintaining the maximum illuminance of the ultraviolet ray in the high part T2 at a value not more than 4.5 W/cm², and consequently, the integrated light amount per one pass is reduced as well. In contrast, if the first pitch x is increased while maintaining the second pitch y at a constant value, then luminance of each of the light emitting diode chips DT can be increased, and consequently, the integrated light amount per one pass is increased as well.

Figure 6:
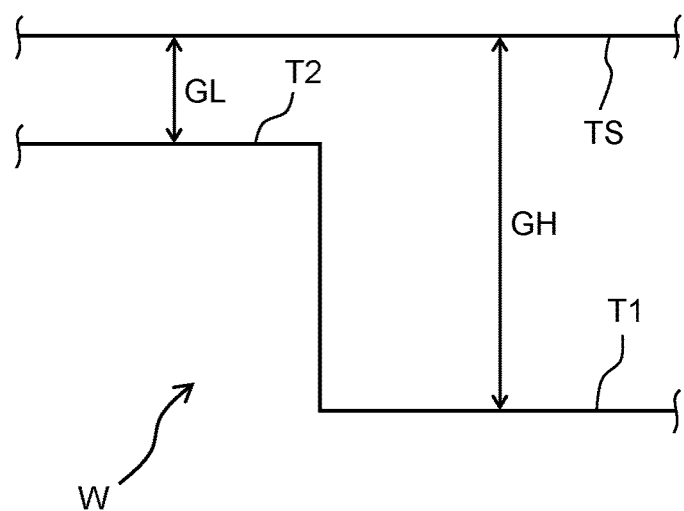
FIG. 6 is a view depicting a large gap and a small gap.

The graph of dash-dot-line in FIG. 5 indicates an electric current value supplied to each of the light emitting diodes DT in a case that the ultraviolet ray is irradiated to the printing object W such that the maximum illuminance of the ultraviolet ray in the high part T2 of the printing object W is 4.5 W/cm². As indicated by the dash-dot-line of FIG. 5, if the first pitch x is reduced while maintaining the second pitch y at a constant value, the light emitting diode chips DT are more crowded in the main scanning direction Ds, and thus, the maximum illuminance reaches 4.5 W/cm$^2$ at a smaller electric current value. In contrast, if the first pitch x is increased while maintaining the second pitch y at a constant value, the maximum illuminance reaches 4.5 W/cm$^2$ at a greater electric current value Firstly, as depicted in FIG. 6, in a case of performing printing on a high part T2, as a part of the printing object W, in which a distance from the ultraviolet ray irradiation surface TS of each of the plurality of light emitting diode chips DT to the printing object W becomes to be a small gap (low gap) GL (for example, 2 mm), it is preferable to make the maximum illuminance of the ultraviolet ray to be not more than 4.5 W/cm$^2$ from a viewpoint of protective property against the thermal effect to the printing object W. Meanwhile, in reality, there is a restriction by the rating of the light emitting diode chip DT, and the maximum value of the current that can be inputted to the light emitting diode chip DT is, for example, 1 A (ampere) based on the rating. According to the graph of the dash-dot-line in FIG. 5, if the first pitch x is greater than 1.9y, the maximum illuminance in the high part T2 does not reach 4.5 W/cm$^2$ even when the electric current value supplied to each of the light emitting diode chips DT is 1 A. In such cases, the illuminance may not be sufficient in a low part T1 (described below) of the printing object W. Namely, x≤1.9y is derived from FIG. 5.

Further, in a case of performing printing on a low part T1, as a part of the printing object W, in which a distance from the ultraviolet ray irradiation surface TS of each of the plurality of light emitting diode chips DT to the printing object becomes to be a large gap (high gap) GH (for example, 18 mm), an integrated light amount at the time of one pass required for sufficiently secure the ink curability is not less than 85 mJ/cm$^2$. Namely, the integrated light amount by the plurality of light emitting diode chips DT in the low part T1 of the printing object W which can be obtained in one pass of the discharging head 10 is not less than 85 mJ/cm$^2$. Accordingly, 1.4y≤x is derived from FIG. 5. From the above, it is possible to obtain 1.4y≤x≤1.9y. Here, a value of the second pitch y can be between 1 mm and 10 mm, can be between 2 mm and 7 mm, and can be between 4 mm and 5 mm. A radiant flux of each of the light emitting diode chips DT can be approximately 1W, for example. A package size of each of the diode chips DT can be approximately 3.5-millimeter-square, for example. In the present embodiment, the first pitch x is adjusted so that a minimum integrated light amount becomes to be 85 mJ/cm$^2$ at a part, of the printing object W, which is subjected to the large gap printing. Further, the second pitch y is adjusted so that a maximum illuminance at the high part T2, of the printing object W, which is apart from the ultraviolet ray irradiation surface TS by 2 mm as the lower limit of the small gap GL, becomes to be not more than 4.5 W/cm$^2$. This lower limit (2 mm) of the small gap GL is a value to be set so that the printing object W and the discharging head 10 and/or the light emitting diode chip DT are not rubbed to each other, in consideration of any variation in assembly precision. Furthermore, in the low part T1, of the printing object W, which is apart from the ultraviolet ray irradiation surface TS by 18 mm as the upper limit of the large gap GH, an electric current value to be supplied to the light emitting diode chip DT is set so that the illuminance at a position or location, in the low part T1, corresponding to the end part of the nozzle array becomes to be 1.1 W/cm$^2$. This upper limit (18 mm) of the large gap GH is a value set as a distance by which any deviation in landing of the ink droplet falls within a predetermined range and by which a fine image may be printed.

Figure 7:
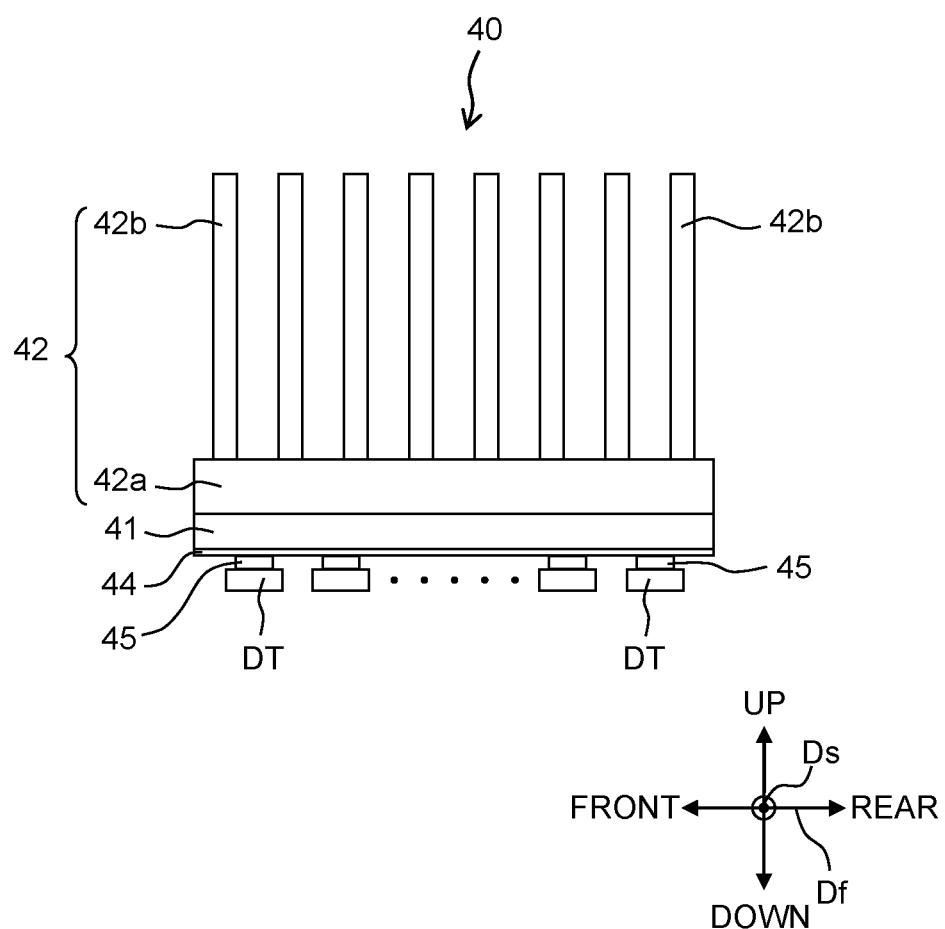
FIG. 7 is a view schematically depicting the internal configuration of the ultraviolet ray irradiating apparatus.

Next, a heat radiating structure of the ultraviolet ray irradiating apparatus 40 will be explained. FIG. 7 is a view schematically depicting the internal configuration of the ultraviolet ray irradiating apparatus 40. As depicted in FIG. 7, the ultraviolet ray irradiating apparatus 40 includes the above-described supporting substrate 41 which supports the plurality of light emitting diode chips DT, and a plate-shaped heat sink 42 provided on a surface (upper surface) which is included in surfaces of the supporting substrate 41 and which is on the opposite side to another surface (lower surface) of the supporting substrate 41 provided with the plurality of light emitting diode chips DT. The heat sink 42 includes a base part 42a arranged on the supporting substrate 41 and a plurality of heat radiating plates (fins) 42b extending in an up direction on the base part 42a. The respective heat radiating plates 42b are arranged at an equal spacing distance. Further, non-illustrated electronic parts are provided on the lower surface of the supporting substrate 41, and a plurality of electrodes 45 are provided on these electronic parts corresponding to the plurality of light emitting diode chips DT, respectively. Each of the plurality of light emitting diode chips DT is electrically connected to one of the plurality of electrodes 45. In a state that a portion of each of the plurality of electrodes 45 is exposed, the lower surface of the supporting substrate 41 is covered with an insulative film 44. In such a configuration, a heat generated by each of the plurality of light emitting diode chips DT is radiated upward through heat sink 42.

As described above, according to the ultraviolet ray irradiating apparatus 40 of the present embodiment, by making the first pitch x to be greater than the second pitch y, it is possible to increase the integrated light amount (integrated light amount of the ultraviolet ray by the plurality of light emitting diode chips DT which is obtained in one pass of the discharging head) while securing the maximum illuminance of the plurality of light emitting diode chips DT to be not more than a predetermined value at the part of the printing object W subjected to the small gap printing. With this, it is possible to avoid unnecessarily increasing of the maximum illuminance at the part of the printing object subjected to the small gap printing, and thus the temperature rise in the printing object W is suppressed. Further, by making the first pitch x to be greater than the second pitch y, namely, by making the arrangement pitch in the main scanning direction Ds which is the moving direction of the discharging head 10 to be relatively great, it is possible to secure the irradiation time by the plurality of light emitting diode chips DT (an irradiation time in a case that the ultraviolet ray irradiating apparatus 40 is mounted on the carriage 3 and that the moving speed of the carriage 3 is made constant) to be long compared to a case in which, for example, the first pitch x is identical to the second pitch y. With this, it is possible to achieve an effect that the ink can be sufficiently cured at a part subjected to the large gap printing. As such, by increasing the first pitch x in the main scanning direction Ds so that the ultraviolet ray is irradiated with lower illuminance for longer period, the maximum illuminance can be restricted from increasing in the part of the printing object W subjected to the small gap printing, and simultaneously, the integrated light amount can be restricted from reducing in the part of the printing object W subjected to the large gap printing. By the configuration as described above, it is possible to suppress the temperature rise in the printing object W at the part thereof subjected to the small gap printing and to improve the ink curability in the printing object W at the part thereof subjected to the large gap printing.

Further, in the present embodiment, since 1.4y≤x holds in the relationship between the first pitch x and the second pitch y, it is possible to secure the ink curability even in the part subjected to the large gap printing in an ensured manner.

Furthermore, in the present embodiment, since x≤1.9y holds in the relationship between the first pitch x and the second pitch y, it is possible to suppress or prevent the thermal damage to the printing object W. With this, it is possible to secure a protective property for the printing object W.

Moreover, in the present embodiment, the integrated light amount by the plurality of light emitting diode chips DT, at the part subjected to the large gap printing, which is obtained in one pass of the discharging head 10 is made to be not less than the minimum integrated light amount (85 mJ/cm²) which is required for the discharged ink to cure, thereby making it possible to irradiate the ink sufficiently with the ultraviolet ray and thus to improve the curability of the ink.

Further, in the present embodiment, it is possible to make the integrated light mount at the part subjected to the large gap printing, in a state that the large gap GH is not less than 7 mm, to be not less than 85 mJ/cm², thereby making it possible to improve the ink curability.

Moreover, in the present embodiment, the electric current value to be supplied to the light emitting diode chip DT is set so that the illuminance in the part, of the printing object W, subjected to large gap printing in a state that the large gap GH is not more than 18 mm, becomes to be 1.1 W/cm² at a position of the part corresponding to the end part of the nozzle array. This makes it possible to improve the curability of the ink discharged to the part corresponding to the end part of the nozzle array.

Further, in the present embodiment, it is possible to suppress the temperature rise in the printing object W, by not increasing the maximum illuminance more than as being required, even in the part, of the printing object W, subjected to the small gap printing in a state that the small gap GH is not less than 2 mm.

Further, in the present embodiment, since the integrated light amount can be made to be not less than 85 mJ/cm² even in the part, of the printing object W, subjected to the large gap printing in a state that the difference between the large gap GH and the small gap GL is not less than 5 mm, the ink curability can be improved.

Furthermore, in the present embodiment, an electric current which is not more than 1 A is supplied by the electric current supplying part 20a, as a predetermined value determined based on the maximum illuminance (4.5 W/cm²) of the ultraviolet ray by the plurality of light emitting diode chips DT obtained in one pass of the discharging head 10 in a case that the distance between the ultraviolet ray irradiation surface TS and the printing object W is the small gap GL. With this, it is possible to protect the printing object W by making the maximum illuminance to be not more than 4.5 W/cm².

Moreover, by providing the above-described ultraviolet ray irradiating apparatus 40 on the image recording apparatus 1, it is possible to suppress the temperature rise in the printing object W at the part thereof subjected to the small gap printing in the image recording apparatus 1, and to improve the ink curability at the part of the printing object W subjected to large gap printing in the image recording apparatus 1.

<Modifications>

The present invention is not limited to the above-described embodiment, and various change or modifications are possible within a range not deviating from the gist of the present invention. The following is examples of modification.

In the above-described embodiment, although x≤1.9y is made to held in the case of determining the first pitch x and the second pitch y, the present disclosure is not limited to this; it is allowable to make, for example, x≤1.8y to be held for securing the protective property of the printing object against the thermal effect, in more ensured manner.

Further, in the above-described embodiment, although 1.4y≤x is made to be held in the case of determining the first pitch x and the second pitch y, the present disclosure is not limited to this; it is allowable to make 1.5y≤x is made to be held in order to secure the ink curability in a more ensured manner.

Furthermore, in the above-described embodiment, although the large gap GH is made to be 18 mm and the small gap GL is made to be 2 mm, the large gap GH and the small gap GL are not limited to the above-described values, respectively; it is sufficient that the small gap GL is smaller than the large gap GH. For example, the large gap GH is not less than 7 mm and the difference between the large gap GH and the small gap GL is not less than 5 mm.

Moreover, in the above-described embodiment, although the two discharging heads 10 (10A, 10B) and the two ultraviolet ray irradiating apparatuses 40 (40A, 40B) are mounted on the carriage 3, the present invention is not limited to this; it is allowable that only the discharging head 10A and only the ultraviolet ray irradiating apparatus 40A are mounted on the carriage 3.

According to the above embodiment, it is possible to provide: an ultraviolet ray irradiating apparatus capable of suppressing the temperature rise in the part, of the printing object, which is subjected to the small gap printing and improving the ink curability in the part, of the printing object, which is subjected to large gap printing; and an image recording apparatus provided with the same.

What is claimed is:

1. An ultraviolet ray irradiating apparatus configured to cure an ultraviolet-curable ink discharged to an object, by a discharging head which is configured to move in a main scanning direction, in a state that the ultraviolet ray irradiating apparatus is moved in the main scanning direction,
the ultraviolet ray irradiating apparatus comprising a plurality of light emitting chips configured to emit an ultraviolet ray, the plurality of light emitting chips being arranged side by side with a first pitch in the main scanning direction and being arranged side by side with a second pitch smaller than the first pitch in a sub scanning direction orthogonal to the main scanning direction.

2. The ultraviolet ray irradiating apparatus according to claim 1, wherein 1.4y≤x holds, provided that x is the first pitch and y is the second pitch.

3. The ultraviolet ray irradiating apparatus according to claim 1, wherein x≤1.9y holds, provided that x is the first pitch and y is the second pitch.

4. The ultraviolet ray irradiating apparatus according to claim 1, wherein 1.4y≤x≤1.9y holds, provided that x is the first pitch and y is the second pitch.

5. The ultraviolet ray irradiating apparatus according to claim 1, wherein the object includes a low part in which a distance from an ultraviolet ray irradiation surface of each of the plurality of light emitting chips to the object becomes to be a large gap and a high part in which the distance from the ultraviolet ray irradiation surface to the object becomes to be a small gap smaller than the large gap; and an integrated light amount of the ultraviolet ray emitted by the plurality of light emitting chips in the low part obtained in one pass of the discharging head is not less than a minimum integrated light amount of the ultraviolet ray required for the discharged ink to cure.

6. The ultraviolet ray irradiating apparatus according to claim 5 further comprising a controller configured to control the plurality of light emitting chips such that the integrated light amount of the ultraviolet ray emitted by the plurality of light emitting chips in the low part obtained in one pass of the discharging head is not less than the minimum integrated light amount of the ultraviolet ray required for the discharged ink to cure.

7. The ultraviolet ray irradiating apparatus according to claim 6, wherein the controller is configured to control the plurality of light emitting chips based on information about the distance from the ultraviolet ray irradiation surface to the object such that the integrated light amount in the low part obtained is not less than the minimum integrated light amount.

8. The ultraviolet ray irradiating apparatus according to claim 7 further comprising a distance detector configured to detect the distance from the ultraviolet ray irradiation surface to the object, wherein the controller is configured to control the plurality of light emitting chips based on the distance detected by the distance detector such that the integrated light amount in the low part is not less than the minimum integrated light amount.

9. The ultraviolet ray irradiating apparatus according to claim 5, wherein the ultraviolet ray irradiating apparatus is configured to irradiate the object with the ultraviolet ray such that the integrated light amount of the ultraviolet ray emitted by the plurality of light emitting chips in the low part obtained in one pass of the discharging head is not less than the minimum integrated light amount of the ultraviolet ray required for the discharged ink to cure, in a state that magnitudes of luminance of the respective light emitting chips are identical to each other.

10. The ultraviolet ray irradiating apparatus according to claim 5, wherein the minimum integrated light amount required for the discharged ink to cure is not less than 85 $mJ/cm^2$.

11. The ultraviolet ray irradiating apparatus according to claim 5, wherein the large gap is not less than 7 mm.

12. The ultraviolet ray irradiating apparatus according to claim 5, wherein the large gap is not more than 18 mm.

13. The ultraviolet ray irradiating apparatus according to claim 5, wherein the small gap is not less than 2 mm.

14. The ultraviolet ray irradiating apparatus according to claim 5, wherein a difference between the large gap and the small gap is not less than 5 mm.

15. The ultraviolet ray irradiating apparatus according to claim 5, further comprising an electric current supplier configured to supply an electric current to the plurality of light emitting chips, the electric current having not more than a predetermined value determined based on a maximum illuminance of the ultraviolet ray by the plurality of light emitting chips in the high part.

16. The ultraviolet ray irradiating apparatus according to claim 15, wherein the maximum illuminance is 4.5 $W/cm^2$.

17. The ultraviolet ray irradiating apparatus according to claim 15, wherein the electric current supplier is configured to supply an electric current of not more than 1 ampere as the electric current having not more than the predetermined value.

18. The ultraviolet ray irradiating apparatus according to claim 1, wherein the ultraviolet ray irradiating apparatus is configured to irradiate the object with the ultraviolet ray, in a state that magnitudes of luminance of the respective light emitting chips are identical to each other.

19. An image recording apparatus comprising: a carriage provided with the ultraviolet ray irradiating apparatus as defined in claim 1 and the discharging head.

* * * * *